(12) United States Patent
Andersson

(10) Patent No.: US 6,173,168 B1
(45) Date of Patent: Jan. 9, 2001

(54) OPTIMIZED CELL RECOVERY IN A MOBILE RADIO COMMUNICATIONS NETWORK

(75) Inventor: Hans Andersson, Vreta Kloster (SE)

(73) Assignee: Telefonaktiebolaget LM Ericsson (SE)

(*) Notice: Under 35 U.S.C. 154(b), the term of this patent shall be extended for 0 days.

(21) Appl. No.: 09/064,644

(22) Filed: Apr. 22, 1998

(51) Int. Cl.$^7$ .............. H04M 11/00; H04Q 7/20

(52) U.S. Cl. ............. 455/404; 455/404; 455/422; 455/423; 455/449; 455/450

(58) Field of Search ............. 455/422, 423–425, 455/446, 450, 453, 560, 561, 511, 514, 8, 9, 67.1, 67.4

(56) References Cited

U.S. PATENT DOCUMENTS

| | | | |
|---|---|---|---|
| 4,901,314 | * 2/1990 | Lohrbach | 371/11.2 |
| 5,226,071 | * 7/1993 | Bolliger et al. | 379/60 |
| 5,335,356 | * 8/1994 | Andersson | 455/54.1 |
| 5,437,056 | * 7/1995 | Rautiola | 455/34.1 |
| 5,448,766 | * 9/1995 | Sanning et al. | 455/103 |
| 5,530,908 | * 6/1996 | Rozenstrauch et al. | 455/8 |
| 5,752,161 | * 5/1998 | Jantti et al. | 455/8 |
| 5,774,786 | * 6/1998 | Wirtjes et al. | 455/8 |
| 6,021,333 | * 2/2000 | Anderson et al. | 455/560 |

OTHER PUBLICATIONS

Redmondino G et al., "An expert system for radio mobile network monitoring", vol. 3 of 3; pp. 1885–1889; Iee International Conference on Communications '93, Geneve, May 23–26, 1993.*

* cited by examiner

*Primary Examiner*—Daniel S. Hunter
*Assistant Examiner*—Meliss Zewdu N
(74) *Attorney, Agent, or Firm*—Jenkens & Gilchrist

(57) ABSTRACT

A method and system are disclosed for more effectively restoring cells in a radio communications network taking into account current traffic conditions. The disclosed method can be implemented in a number of ways. For example, if a network operator desires to prioritize recovery on a cell-by-cell basis, the order of prioritization can be overlaid on the present method (e.g., for all "priority 1" cells, the present method will be used to select a cell recovery order). Alternatively, the present method can be overlaid on an operator's order of prioritization (e.g., for all cells that are classified most urgent according to the present method, the operator's priorities will be used to select the cell recovery order). As another example, if a hierarchical cell structure is used, the underlaid cells can be selected for recovery during the initial recovery operation (e.g., for a speedier recovery). Also, a recovery order sequence can be used to select certain cells from within the group of underlaid cells. The radio network's recovery is thus optimized by taking into account the actual traffic requirements in the network, node and/or cells involved.

12 Claims, 1 Drawing Sheet

OPTIMIZED CELL RECOVERY IN A MOBILE RADIO COMMUNICATIONS NETWORK

BACKGROUND OF THE INVENTION

1. Technical Field of the Invention

The present invention relates in general to the mobile radio communications field and, in particular, to a method and system for recovering from cell outages in a mobile radio communications network.

2. Description of Related Art

From time to time, the radio coverage for one or more cells in a cellular network has to be restored. For example, a cell can be made inoperative because of a software or hardware failure in a base station or transceiver unit that creates and defines that cell. As such, in order to minimize the negative impact on network traffic due to these inoperative cells, it is an important network objective to restore service in these cells in an optimum manner.

Typical network switching systems where such cell outages occur are in mobile services switching centers (MSCs) or radio network controllers (RNCs). Currently, only a relatively small number of these switching systems can control up to a few hundred cells at a time, which essentially has limited the negative impact of the inoperative cells, and thus, the extent of the recovery required. However, as vendors are now producing much higher-capacity switches (e.g., capable of controlling several hundred cells/transceivers), the problem of how to optimally restore service for the potentially much larger numbers of inoperative cells poses a more difficult design challenge.

A number of existing and planned network cell recovery techniques are optimized for greater coverage. In other words, during the initial recovery phase, only one or a few channels are brought into service in each cell. During the next phase, more channels are restored in each cell, and so on, until the cell recovery operation is complete. As such, this gradual recovery approach works adequately during low traffic periods (e.g., at night). However, this gradual recovery technique is much less effective during periods of high traffic, or when a number of the cells differ in terms of traffic demand and/or general importance.

Other existing and planned network cell recovery techniques are based on prioritization of the cells. In other words, some (e.g., higher priority) cells are restored more or less completely, and then the lower priority cells are restored. This priority recovery technique is less effective during low traffic periods (typically when most cell recovery operations are scheduled). For example, there is little point in restoring 40 channels per cell during the night (low traffic period). This shortcoming of the priority recovery technique becomes more evident, if for example, an emergency call cannot be processed in a lower priority cell which has not yet been restored. Essentially, the existing and planned network cell recovery techniques afford less network availability than operators require. However, as described in detail below, the present invention successfully resolves these problems.

SUMMARY OF THE INVENTION

In accordance with the present invention, a method and system are provided for more effectively restoring cells in a radio communications network, whereby the current traffic conditions are taken into account. The present invention can be implemented in a number of ways. For example, if a network operator desires to prioritize recovery on a cell-by-cell basis, the order of prioritization can be overlaid on the inventive method (e.g., for all "priority 1" cells, the present method will be used to select a cell recovery order). Alternatively, the inventive method can be overlaid on an operator's order of prioritization (e.g., for all cells that are classified most urgent according to the inventive method, the operator's priorities will be used to select the cell recovery order). As another example, if a hierarchical (overlaid/underlaid) cell structure is in use, the underlaid cells can be selected for recovery during the initial recovery operation (e.g., for a speedier recovery). Also, a recovery order sequence can be used to select certain cells from within the group of underlaid cells. As such, in accordance with the present invention, the radio network's recovery can be optimized by taking into account the actual traffic requirements in the network, or in the node and/or cells involved.

An important technical advantage of the present invention is that network cell recovery can be optimized, because the actual traffic conditions in the network are taken into account.

Another important technical advantage of the present invention is that network recovery speed can be increased over conventional techniques.

Still another important technical advantage of the present invention is that service availability as perceived by the end user during different traffic conditions, can be maximized.

Yet another important technical advantage of the present invention is that loss of traffic is minimized, which in turn, minimizes revenue losses for operators.

Still another important technical advantage of the present invention is that the recovery of certain channels to handle more important services (e.g., emergency calls) can be prioritized.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
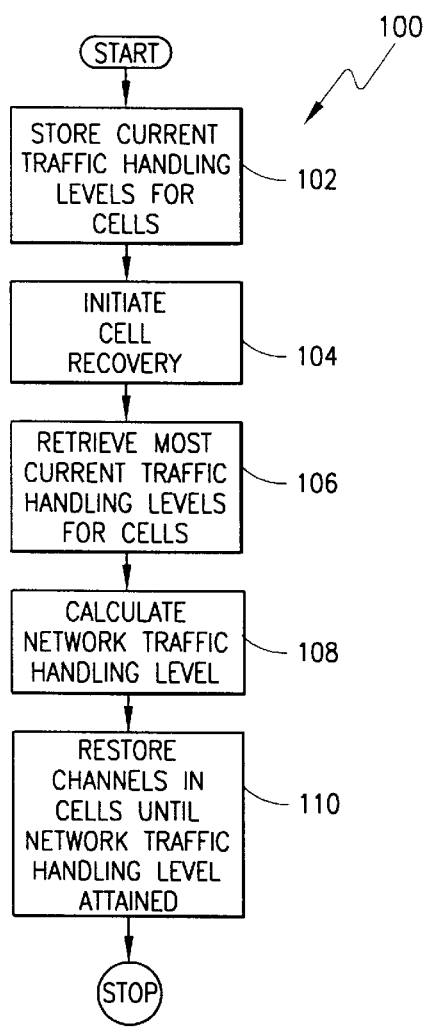
FIG. 1 is a flow diagram that illustrates an exemplary method for optimally restoring a plurality of cells in a radio communications network by taking into account the current traffic conditions, in accordance with a preferred embodiment of the present invention.
Figure 3:
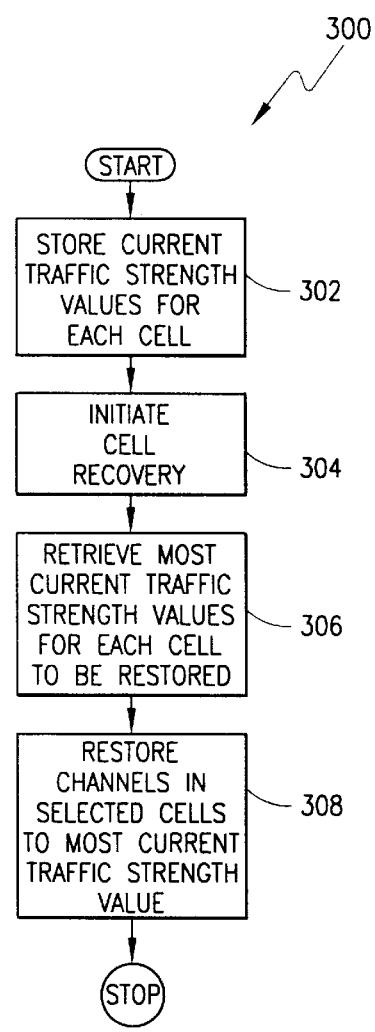
FIG. 3 is a flow diagram that illustrates an exemplary method for optimally restoring a plurality of cells in a radio communications network by taking into account the current traffic conditions, in accordance with a second embodiment of the present invention.
Figure 2:
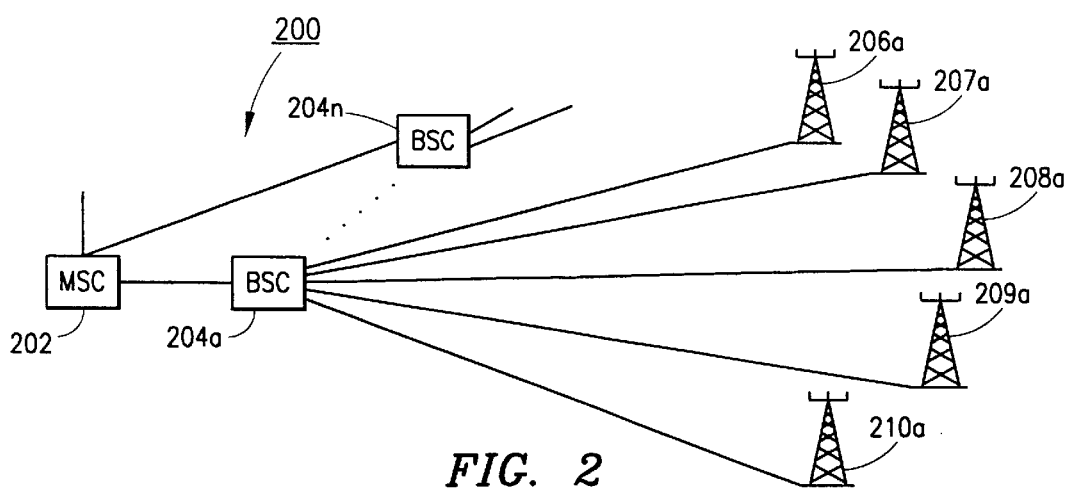
FIG. 2 is a simplified block diagram of an exemplary cellular communications network, which can be used to implement the method shown in FIG. 1.

The preferred embodiment of the present invention and its advantages are best understood by referring to FIGS. 1–3 of the drawings, like numerals being used for like and corresponding parts of the various drawings.

Essentially, in accordance with the present invention, a method and system are provided for more effectively restoring cells in a cellular communication network, whereby the current traffic conditions are taken into account. The present invention can be implemented in a number of ways. For example, if a network operator desires to prioritize restoration on a cell-by-cell basis, the order of prioritization can be overlaid on the inventive method (e.g., for all "priority 1" cells, the inventive method will be used to select a cell recovery order). Alternatively, the inventive method can be overlaid on an operator's order of prioritization (e.g., for all cells that the inventive method classifies most urgent, the operator's priorities will be used to select a cell recovery order).

As another example, if a hierarchical cell structure is being used, the underlaid cells may be selected for recovery during the initial recovery operation (e.g., for a speedier recovery). Also, the present invention can be used to select a recovery order from within the group of underlaid cells. As such, in accordance with the present invention, the radio network's recovery can be optimized by taking into account the actual traffic requirements in the network, or in the node and/or cells involved.

Specifically, in accordance with a first embodiment of the present invention, a network's cells can be restored until there is adequate capacity to handle the current traffic requirements. For example, during a low traffic period (e.g., at night) using such an optimal approach, the present method restores only one (or a few) channels in each cell during the initial recovery operation. This method can be used to obtain broader cell coverage at a maximum rate. For high traffic periods, the present method efficiently (from both a processing and traffic standpoint) restores a substantial number of channels in each cell during the initial recovery operation. In this manner, the network cells can be restored more effectively up to the extent needed to support the network's current traffic levels.

FIG. 1 is a flow diagram that illustrates an exemplary method 100 for optimally restoring a plurality of cells in a radio communications network by taking into account the current traffic conditions, in accordance with a preferred embodiment of the present invention. FIG. 2 is a simplified block diagram of an exemplary cellular communications network 200, which can be used to implement the method (100) shown in FIG. 1. Note that the cellular network 200 in FIG. 2 is depicted as part of a Global System for Mobile Communications (GSM) Public Land Mobile Network (PLMN). However, the particular arrangement shown is for illustrative purposes only and not intended to so limit the present invention. For example, cellular network 200 can be an Advanced Mobile Phone System (AMPS) network, a Digital-AMPS (D-AMPS) network, or a Personal Digital Cellular (PDC) network.

Network 200 includes an MSC 202 connected to a plurality of base station controllers (BSCs) 204a–204n (where "n" denotes the "nth" BSC). The MSC 202 includes a switch that routes calls to and from the BSCs 204a–204n and other telephony and data communication networks. Each BSC 204a–204n is connected to a plurality of base transceiver stations (BTSs) and controls such BTS functions as handovers and channel assignments. More importantly, however, each BSC controls the channel and cell recovery operations for its respective BTSs. For the exemplary embodiment shown, each BSC 204a–204n can control the network cell recovery operations for five BTSs (e.g., BTSs 206a–210a). Each BTS operates (transmits and receives) on a selected set of radio channels, and defines the coverage of a respective cell in network 200.

Referring now to step 102 in FIG. 1, under the direction of the MSC 202, each BSC 204a–204n periodically monitors and stores (preferably in local memory) pertinent traffic handling level information for each cell under that BSC's control (e.g., defined by each BTS 206a–210a). For example, at regular intervals (e.g., 15 minutes), each BSC can store information associated with the current traffic levels in each of its respective cells. This information can be in the form of (channel) processing load or number of calls processed per unit time. This stored traffic level information is preferably expressed as a percentage of the traffic in the cell. For example, minimal or no traffic in a cell is represented as a traffic level of 0% for that cell, and maximum traffic in a cell is represented as a traffic level of 100%.

At step 104, assuming for illustrative purposes that certain cell outages have occurred, the network operator (or an automatic process) sends an order to the MSC 202, in order to initiate a cell recovery operation. In response, at step 106, an RNC (not shown) directs each BSC involved in the recovery operation to retrieve the stored traffic handling information for all involved network cells (e.g., cells defined by BTSs 206a–210a, etc.). As such, the BSCs are typically responsible for implementing cell recovery in GSM-based networks, but in other types of networks (e.g., AMPS, PDC, etc.), the MSCs have this responsibility. However, in all such systems, an RNC is the node that connects the base stations and is actually in control of the cell recovery. An RNC can be an MSC or a BSC. As described earlier, the retrieved traffic handling information represents the latest traffic condition information for the cells in the network, at least up to the point when the recovery operation was initiated. At step 108, the MSC 202 calculates the overall traffic handling level (percentage) for the network, from the retrieved traffic handling information for all cells.

Next, at step 110, the RNC directs each BSC involved in the recovery operation to send a control message to its respective BTS(s), which directs those BTS(s) to begin restoring channel s until the overall (calculated) network traffic handling level is attained.

For example, the BTS for each cell being restored can be directed to restore channel operations in accordance with the expression: INT(X/100*channels)+1, where "X" represents the retrieved traffic level value expressed in percent, and "channels" represents the total number of channels available in that cell.

Consequently, in recovering from a period of low traffic (e.g., assume that the network's traffic handling level was 10% prior to the recovery), and for an exemplary cell (e.g., 206a) with 6 channels, the number of channels to be restored is INT(0.10*6)+1=1. In other words, one channel can be restored in the six-channel cell (206a) to attain the 10% (low) traffic level. Similarly, in order to attain the network's traffic handling level of 10% with a different cell (e.g., 210a) having 30 channels, the number of channels in that cell to be restored is INT(0.10*30)+1=4 channels.

Alternatively, in effecting a recovery from a high traffic period (e.g., assume that the traffic handling level was 80% prior to the recovery), and for a cell (e.g., 206a) with 6 channels, the number of channels in that cell that can be restored to attain the 80% level is INT(0.80*6)+1=5 channels. Similarly, in order to attain the traffic handling level of 80% with a cell having 30 channels, the number of channels in that cell to be restored is INT(0.80*30)+1=25 channels.

In a second embodiment of the present invention, and taking into account the network's current traffic conditions, each cell can be restored to the traffic level which that cell was handling prior to an outage or initiation of the recovery operation. For example, at least one conventional statistical counter (not shown) can be used to measure traffic strength for each cell involved. Such a counter preferably expresses the traffic strength for a cell directly in Erlangs.

Alternatively, the traffic strength (in Erlangs) for a cell can be derived in a number of different ways, such as, for example, from the number of attempted calls made per unit time, multiplied by a conventional value for an average call holding (conversation) time. For example, the traffic strength for a cell (in Erlangs) can be measured by a processor in the MSC 202 or pertinent BSC (e.g., 204*a*), and expressed as: traffic(E)=n*T/3600, where "n" equals the number of calls per hour and subscriber, and "T" equals the average conversation time in seconds.

FIG. 3 is a flow diagram that illustrates an exemplary method 300 for optimally restoring a plurality of cells in a radio communications network by taking into account the current traffic conditions, in accordance with the second embodiment of the present invention. At step 302 in FIG. 3, and as described directly above, the traffic strength information for a cell can be measured and stored at regular intervals (e.g., once every 15 minutes) at the pertinent BSC (or the MSC) in a local memory file.

At step 304, assuming for illustrative purposes that one or more cell outages have occurred, the RNC directs the BSC to initiate a radio network recovery operation. At step 306, the MSC 202 retrieves the traffic strength values last stored for each cell prior to the recovery operation (or at least prior to an outage for a particular cell). At step 308, the RNC directs the pertinent BSC(s) (e.g., BSC 204*a*) to control the restoration of the respective cells (e.g., 206*a*–210*a*) to the (retrieved) traffic strength level each cell carried prior to the recovery operation (plus an offset value if so desired).

For example, for a cell that had been carrying 5 Erlangs of traffic prior to a recovery (or outage), the present method (300) can immediately restore 5 traffic channels that can carry in total the 5 Erlangs, during the initial recovery operation. The remainder of the cell recovery operation can occur at a later time.

In a different aspect of this embodiment, returning to step 302 in FIG. 3, the current traffic strength level is again measured for each cell using at least one statistical counter (or other conventional technique), and stored at regular intervals. For this aspect of the invention, the traffic strength information can be stored in a list in local memory. In this list, the cell information is preferably sorted in descending order, and then stored. The order can be based, for example, on the cell having the most current traffic strength level measurement being placed at the top of the list, the cell with the next-most current level placed at the next position in the list, and so on. As such, when the MSC 202 initiates the radio network recovery, the stored list of cells sorted according to the currency of the measured traffic strength values is retrieved, and the RNC directs the pertinent BSC(s) to restore the cells in the listed order. Consequently, certain cells can be selectively restored to service first. For example, during periods of high traffic, some coverage areas may be the most heavily used traffic-wise, and those cells could be restored to service first (based on higher demand). Alternatively, during periods of low traffic, the traffic patterns in cells may be more "occasional." However, if there have been a few calls in such a low traffic area during a relatively short period of time (e.g., 3 or 4 calls in the past 30 minutes), it is highly likely that more calls would occur soon in the same area, and the cell(s) covering that area could be restored to service first.

In a third embodiment of the present invention, the inventive method can be used to restore certain channels on demand. Initially, the MSC configures all cells (via the pertinent base stations) so that access requests from mobile terminals can be received. For example, in the GSM, initially the Broadcast Control Channels (BCCHs) can be configured for mobile terminal access requests. As such, if the Immediate Assignment (IA) to a Traffic Channel (TCH) capability is not used by an operator for all cells, then the Stand-alone Dedicated Control Channels (SDCCHs) can be so configured. However, until at least one traffic channel (TCH in the GSM) is configured in the cell involved, only the high priority access requests are processed further in the network. The other (lower priority) access requests are preferably rejected (or discarded). The rejection can be accomplished locally, such as, for example, in the base station (BSC) or the transceiver unit (BTS).

Next, a "basic" cell recovery operation can be executed as a background application (e.g., with a "priority 3"). In addition, in accordance with the present invention, channels having a priority higher than a predefined priority level are restored on demand (e.g., as soon as the access requests are detected at the network side). For example, access requests for emergency calls can be stored in a queue having the highest priority (e.g., "priority 1"). Access requests for "typical" calls can be stored in a second queue having a lower priority (e.g., "priority 2"), and so on.

For this embodiment, the minimum size of the queues can be selected to ensure that call setup delays are acceptable. When a queue is full, any additional (excess) access requests for that queue can be rejected. When no new configuration is needed for a request to access a cell, the traffic channels in that cell can be reused.

Notably, as described earlier, once a predefined number of traffic channels are restored and thus made available for traffic in a cell, the subsequent access requests will be processed further by the network. However, the resulting increased processing requirement can produce a significant network load. As such, even if operation with a maximum load is desirable during a recovery operation (e.g., to more quickly minimize the effects of the outages), it is important that an overload not lead to performance problems. Consequently, the present method gives a network operator an improved ability to handle overloads, by limiting the window size (duration) of the layer 2 signalling between the base station (or transceiver unit) and the switch (MSC). As such, when the base station (or transceiver unit) determines that a restored cell has become congested, then subsequent access requests for that cell can be discarded (or rejected) based on a selected priority scheme.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for optimizing cell recovery in a radio communications network, comprising the steps of:

monitoring, by a base station controller, traffic level in a plurality of cells in said radio communications network;

periodically storing, by said base station controller, a performance parameter associated with said monitored traffic level in each of said plurality of cells;

calculating network traffic handling level from said stored performance parameters; and recovering from an outage of a certain cell by restoring a determined number of channels in that certain cell to obtain a performance level in the network corresponding substantially to said calculated network handling level prior to recovering operation of the remaining channels in that certain cell.

2. The method of claim 1, wherein said performance parameter comprises a network traffic handling level.

3. A method for optimizing cell recovery in a radio communications network, comprising the steps of:

monitoring, by a base station controller, traffic level in a plurality of cells in said radio communications network, periodically storing, by said base station controller, a performance parameter associated with said monitored traffic level in each of said plurality of cells; and recovering from an outage of a certain cell by restoring a determined number of channels in that certain cell to obtain a performance level within that certain cell corresponding substantially to said performance parameter stored for that certain cell prior to recovering operation of the remaining channels in that certain cell.

4. The method of claim 3, wherein said performance parameter comprises a traffic strength value.

5. A method for recovering a determined number of channels in cells on a hierarchical demand basis in a radio communications network, comprising the steps of:

responsive to an outage of a certain cell, configuring that certain cell in said radio communications network with a capability to receive mobile terminal access requests;

monitoring within that certain cell for mobile terminal access requests; and responding to a mobile terminal access request by restoring a traffic channel if said access request has a priority level that is greater than or equal to a predefined priority level.

6. The method of claim 5, further comprising the step of network processing said mobile terminal access requests if said access request has a priority level that is greater than or equal to said predefined priority level.

7. The method of claim 5, wherein if said access request has a priority level that is less than said predefined priority level, rejecting said mobile terminal access requests until at least one traffic channel is restored in that certain cell.

8. The method of claim 5, wherein said predefined priority level is associated with an access request for emergency call.

9. A system for optimizing cell recovery in a radio communications network, comprising:

means for monitoring traffic level in a plurality of cells in said radio communications network;

means for periodically storing a performance parameter associated with said monitored traffic level in each of said plurality of cells;

means for calculating network traffic handling level from said stored performance parameters; and means for recovering from an outage of a certain cell by restoring a determined number of channels in that certain cell to obtain a performance level in the network corresponding substantially to said calculated network handling level prior to recovering operation of the remaining channels in that certain cell.

10. The system of claim 9, wherein said performance parameter comprises a network traffic handling level.

11. A system for optimizing cell recovery in a radio communications network, comprising:

means for monitoring traffic level in a plurality of cells in said radio communications network;

means for periodically storing a performance parameter associated with said monitored traffic level in each of said plurality of cells; and means for recovering from an outage of a certain cell by restoring a determined number of channels in that certain cell to obtain a performance level within that certain cell corresponding substantially to said performance parameter stored for that certain cell prior to recovering operation of the remaining channels in that certain cell.

12. The system of claim 11 wherein said performance parameter comprises a traffic strength value.

* * * * *

UNITED STATES PATENT AND TRADEMARK OFFICE
CERTIFICATE OF CORRECTION

PATENT NO. : 6,173,168 B1  
DATED : January 9, 2001  
INVENTOR(S) : Hans Andersson It is certified that error appears in the above-identified patent and that said Letters Patent is hereby corrected as shown below:

Title page,
Item [56], amend the Title page, of the patent as follows:
-- [56] References Cited: Please add:
    U.S. Patent 5,680,326
    U.S. Patent 5,434,798
    U.S. Patent 5,463,615
    U.S. Patent 5,146,452
    WO 97/24896
    WO 96/42177
    Standard Search Report for
    RS101050US completed on 2/1/99

Column 4,
Line 34, replace "channel s" with -- channels --

Signed and Sealed this

Twenty-fifth Day of June, 2002

Attest:

Attesting Officer

JAMES E. ROGAN  
*Director of the United States Patent and Trademark Office*